United States Patent [19]

Saito et al.

[11] Patent Number: 4,749,741
[45] Date of Patent: Jun. 7, 1988

[54] PRIMER COMPOSITION

[75] Inventors: Masayuki Saito; Koji Shimizu; Mitsuo Hamada, all of Chiba, Japan

[73] Assignee: Toray Silicone Co., Ltd., Tokyo, Japan

[21] Appl. No.: 29,123

[22] Filed: Mar. 23, 1987

[30] Foreign Application Priority Data

Apr. 7, 1986 [JP] Japan .................................. 61-79656
May 28, 1986 [JP] Japan ............................... 61-122538
Jul. 28, 1986 [JP] Japan ................................ 61-177137

[51] Int. Cl.$^4$ ............................................. C08L 83/02
[52] U.S. Cl. .................... 524/859; 106/285; 106/287.13; 106/287.14; 106/287.15; 106/287.19; 524/588; 524/356; 524/379; 524/770; 524/765; 524/792; 524/860; 524/861; 524/862; 528/17; 528/31; 528/32
[58] Field of Search .............. 106/285, 287.13, 287.14, 106/287.15, 287.19; 528/31, 32, 17; 524/588, 356, 379, 770, 765, 792, 859, 860, 861, 862

[56] References Cited

U.S. PATENT DOCUMENTS 4,098,758 7/1978 Monte et al. ...................... 106/285
4,654,236 3/1987 Finzel ................................ 427/409

OTHER PUBLICATIONS

Japanese Industrial Standard (JIS) K-6744.

Primary Examiner—Melvyn I. Marquis
Attorney, Agent, or Firm—Robert Spector

[57] ABSTRACT

Cohesive bonding between silicone rubber compositions and plastics is achieved using primer compositions comprising a solution of at least one member of a specified class of organotitanate esters in an organic liquid. Cohesive bonding of silicone rubber compositions to both plastic and metals is achieved by including at least one member from either of two specified classes of organosilicon compounds in the primer composition together with the organotitanate ester.

7 Claims, No Drawings

PRIMER COMPOSITION

BACKGROUND OF THE INVENTION

1. Field of the Invention

The present invention relates to a primer composition, and more specifically to a primer composition which effectively bonds silicone rubber to diverse substrates, particularly synthetic organic resins and metals.

2. Description of the Prior Art

Primers have heretofore been necessary for bonding silicone rubbers to various substrates such as, for example, plastics, glass, metal oxides, and metals. Various primers based on organofunctional silanes have been proposed to date.

However, in the case of substrates having an inert surface, such as plastics, primers based on typical organofunctional silanes are unsatisfactory because they do not achieve adequate adhesion between the silicone rubber and the substrate.

The present inventors conducted investigations in order to solve the aforementioned problem, and discovered that primer compositions containing certain organotitanate esters as the active ingredient effectively bond silicone rubbers to plastics, particularly organic resins. This type of primer, however, is not satisfactory for bonding silicone rubbers to metals. The present inventors also discovered that this disadvantage can be overcome by combining the organotitanate esters with specified classes of organosilicon compounds.

The object of the present invention is to provide primer compositions that effectively bond silicone rubbers to both plastics and metals.

SUMMARY OF THE INVENTION

The objective of obtaining cohesive bonding between silicone rubber compositions and plastics is achieved using primer compositions comprising a solution of at least one member of a specified class of organotitanate esters in an organic liquid. Cohesive bonding of silicone rubber compositions to both plastic and metal substrates is achieved by including at least one member from either of two specified classes of organosilicon compounds in the primer composition together with the organotitanate ester.

DETAILED DESCRIPTION OF THE INVENTION

The present invention provides a primer composition comprising

A. 100 weight parts by weight of an organotitanate ester having the general formula

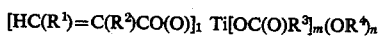

where $R^1$ and $R^2$ individually represent a hydrogen atom or an alkyl radical; $R^3$ and $R^4$ represent identical or different alkyl or aryl radicals; l represents an integer having a value of 1, 2 or 3, m and n represent identical or different integers having a value of 0, 1, 2, or 3; and the sum of l+m+n is equal to 4

B. from 0 to 10,000 parts by weight of either (1) an organosilicon compound having at least 2 silicon-bonded alkoxy groups in each molecule and having the average unit formula

or (2) an organohydrogensilane or an organohydrogenpolysiloxane containing at least one silicon bonded hydrogen atom per molecule and having the average unit formula

where $R^5$ represents a substituted or unsubstituted monovalent hydrocarbon radical exclusive of the substituents represented by $R^6$; $R^6$ represents a monovalent organic group containing an addition-reactive or condensation-reactive functional group; $R^7$ represents an alkyl, aryl or alkoxyalkyl radical; the values of u and v are identical or different and are within the range of from 0 to 3, inclusive, the value of w is greater than 0 up to and including 4, the sum of u and v and w is greater than 0 up to and including 4, the value of x is from 1 up to but not including 3, the value of y is from 0 up to but not including 3, the value of z is from 0 to 3, inclusive, and the sum of x+y+z is greater than 0 up to and including 4.

C. a quantity of organic liquid sufficient to solubilize said composition.

The organotitanate ester referred to hereinabove as component (A) of the present primer compositions is essential for providing adhesion of silicone rubber to plastic substrates, particularly organic resins such as polyamides, polycarbonates and terpolymers of acrylonitrile, butadiene and styrene (ABS).

In the foregoing formula for the organotitanate ester $R^1$ and $R^2$ are individually selected from the hydrogen atom and alkyl radicals. The alkyl radicals are exemplified by methyl, ethyl, and propyl. The substituents represented by $R^3$ and $R^4$ are identical or different alkyl or aryl radicals, the alkyl radicals being exemplified by methyl, ethyl, propyl, isopropyl, and butyl; and the aryl radicals being exemplified by phenyl and tolyl. The integer represented by l has a value of from 1 to 3, inclusive, and the integers represented by m and n are identical or different and have values from 0 to 3, inclusive, with the proviso that the sum of the integers represented by l, m and n is 4.

The titanium atom of the present organotitanate esters is bonded to at least one residue resulting from removal of the hydrogen atom from the carboxyl group of an ethylenically unsaturated monocarboxylic acid such as acrylic or methacrylic acid. Suitable esters include but are not limited to isopropyl dimethacryl isostearoyl titanate, isopropyl diacryl isostearoyl titanate, dibutyl diacryl titanate, and dibutyl isostearoyl methacryl titanate. These organotitanate esters may be used singly, or as mixtures of two or more of these esters.

The organosilicon compound referred to hereinafter as component (B) is essential for improving the adhesion of silicone rubber compositions to metals, but can be omitted from the present compositions when the substrate to which the silicone rubber is to be bonded is a plastic. One of the two classes of organosilicon compounds that can be used as component (B) contains at least 2 silicon-bonded alkoxy groups in each molecule, and has the average unit formula

In this formula $R^5$ represents a substituted or unsubstituted monovalent hydrocarbon radical, exclusive of the radicals represented by $R^6$. The $R^5$ substituent includes but is not limited to alkyl radicals such as methyl, ethyl, propyl, and octyl; aryl radicals such as phenyl; and these radicals in which one or more hydrogen atoms have been replaced by substituents that do not interfere with curing or the adhesion of the primer composition. Examples of such substituents include, but are not limited to, halogen atoms and the cyano group. $R^6$ represents a monovalent organic group having an addition-reactive or condensation-reactive functional group as a substituent. These functional groups are exemplified by vinyl, allyl, epoxy, methacryloxy, mercapto, amino and N-alkylamino, and may be bonded to silicon directly or through a divalent organic group such as methylene, ethylene, propylene, phenylene, fluoroethylene, $-CH_2OCH_2CH_2CH_2-$, $-CH_2CH_2OCH_2CH_2-$, $-CH_2OCH_2CH_2OCH_2CH_2-$, and $-(CH_2)_3(NHCH_2CH_2)_{1-5}-$. $R^7$ represents a radical selected from among alkyl, for example, methyl, ethyl, and propyl; aryl, for example, phenyl; and alkoxyalkyl, for example, 2-methoxyethyl and 2-ethoxyethyl. The values of u and v in the formula for the alkoxy functional organosilicon compounds are identical or different and are within the range of from 0 to 3, inclusive, the value of w is greater than 0 up to and including 4, and the sum of u and v and w is greater than 0 up to but not including 4.

Suitable alkoxy substituted organosilicone compounds include but are not limited to tetraalkoxysilanes, organotrialkoxysilanes, diorganodialkoxysilanes, organopolysiloxanes having at least 2 silicon-bonded alkoxy groups in each molecule, and the partial hydrolysis condensation products of these silanes and organopolysiloxanes. Particularly preferred as component (B) from the standpoints of adhesion and air-dryability are tetraalkoxysilanes and organotrialkoxysilanes having 3 or 4 alkoxyalkyl groups such as 2-methoxyethyl or 2-ethoxyethyl in each molecule as the substituent represented by $R^7$, in addition to partial hydrolysis condensates of these organosilicone compounds.

Concrete examples of this class of organosilicon compounds suitable for use as component (B) are
vinyltrimethoxysilane,
methylvinyldimethoxysilane, p0 vinyltriethoxysilane,
methyltris(beta-methoxyethoxy)silane,
vinyltris(beta-methoxyethoxy)silane,
gamma-methacryloxypropyl(methyl)dimethoxysilane,
gamma-methacryloxypropyltriethoxysilane,
allyltrimethoxysilane,
gamma-mercaptopropyltrimethoxysilane,
gamma-glycidoxypropyltrimethoxysilane,
beta-(3,4-epoxycyclohexyl)ethyltrimethoxysilane,
gamma-aminopropyltriethoxysilane,
N-beta-aminoethyl-gamma-aminopropyltrimethoxysilane,
ethyl orthosilicate,
methyl Cellosolve orthosilicate, represented by the formula $Si(OCH_2CH_2OCH_3)_4$, and
the partial hydrolysis condensates of one species or two or more species of these silanes and silicates.

The second class of organosilicon compounds suitable for use as component (B) of the present primer compositions includes organohydrogensilanes and organohydrogenpolysiloxanes containing at least one silicon bonded hydrogen atom per molecule. These compounds have the average unit formula

where $R^5$ represents a substituted or unsubstituted monovalent hydrocarbon radical as defined hereinbefore; $R^7$ represents an alkyl, aryl or alkoxyalkyl radical as defined hereinbefore; the value of x is from 1 up to but not including 3, the value of y is from 0 up to but not including 3, the value of z is from 0 to 3, inclusive, and the sum of x+v+z is greater than 0 up to and including 4.

This second class of organosilicon compounds suitable for use as component (B) includes but is not limited to trialkoxysilanes, dialkoxysilanes, their partial hydrolysis condensation products and organohydrogenpolysiloxanes.

Specific examples of this class of organosilicon compounds are:
trimethoxysilane,
triethoxysilane,
tri(beta-methoxyethoxy)silane,
methyldimethoxysilane,
methyldiethoxysilane,
diethoxysilane, and
di(beta-ethoxyethoxy)silane.

Also included in this class of organosilicon compounds are the partial hydrolysis condensation products of the preceding silanes, as well as methylhydrogenpolysiloxanes and methylhydrogenpolysiloxane-dimethylpolysiloxane copolymers. Component (B) can be a single organosilicon compound or a mixture containing two or more of these compounds selected from one or both of the aforementioned major classes of organosilicon compounds constituting this component.

Component (B) is crucial to improving the adhesion of the present compositions to metals as well as to plastics. The concentration of component (B) is from 1 to 10,000 parts by weight per 100 parts by weight of component (A), preferably from 5 to 2000 parts by weight of (B) per 100 parts of (A).

Component (C) of the present compositions is an organic liquid that will dissolve both components (A) and (B). The solvent is selected from a consideration of the solubilities of components (A) and (B) and the volatility of the solvent when the primer is applied. Organic liquids suitable as component (C) include but are not limited to the aromatic hydrocarbons, such as toluene, xylene, and benzene; lower acyclic and cyclic hydrocarbons such as hexane and cyclohexane; ketones such as methyl ethyl ketone and acetone; alcohols such as ethanol and isopropanol; and chlorinated solvents such as trichloroethylene. These organic liquids may be used singly or as mixtures of two or more liquids.

The amount of solvent relative to the combined amounts of components (A) and (B) is not specifically restricted, and is to be selected as appropriate from a consideration of the solubilities of components (A) and (B), and the viscosity and applicability of the primer composition. In general, the solvent is used in the range of from about 100 to about 2,000 parts by weight per 100 parts of combined weight of components (A) and (B).

The primer composition of the present invention is easily produced by simply mixing components (A) and (C) to homogeneity. As disclosed hereinbefore component (B) is also present if the substrate to which the silicone rubber composition is to be bonded is a metal.

The primer composition of the present invention may optionally contain various additives, for example, organosilicon compounds such as organopolysiloxanes; inorganic fillers such as fumed silica, precipitated silica, quartz powder, diatomaceous earth, calcium carbonate, red iron oxide and alumina; and various heat stabilizers, organoperoxides and colorants, unless the additive adversely affects the object of the invention, name the achieving of cohesive bonding between a silicone rubber and a plastic or metal substrate.

With regard to use of the primer composition of the present invention, it is preferably applied to the substrate, air-dried for 30 or more minutes and the silicone rubber composition is then applied. In some cases the primer composition may also be dried by heating in order to achieve adhesion of the primer to the substrate.

Primer compositions of the present invention containing only the organotitanate ester, component (A), as the active ingredient composition will cohesively bond silicone rubber to the surfaces of synthetic resins such as nylon 6 resins, nylon 66 resins, ABS resins polycarbonate resins, polyacetal resins, polyester resins, acrylic resins and phenolic resins when the silicone rubber composition is in contact with the substrate during curing. Primer compositions containing both components (A) and (B) will cohesively bond silicone rubber to the aforementioned synthetic resin substrates in addition to the surfaces of metals such as iron, stainless steel, nickel, aluminum and phosphor bronze.

The following examples describe preferred embodiments of the present compositions and should not be interpreted as limiting the scope of the invention as defined in the accompanying claims. Unless otherwise indicated, all parts and percentages in the examples are by weight.

EXAMPLE 1

A primer composition was prepared by dissolving 10 parts isopropyl diacryl isostearoyl titanate (Plainact 11 from Ajinomoto Co., Inc.) in 90 parts toluene. This primer composition was applied to 4 types of synthetic resin boards: nylon 6 resin, nylon 66 resin, polycarbonate resin and ABS resin. The coated boards were then allowed to stand and air-dry at room temperature for 60 minutes. These primer-coated synthetic resin boards were then placed in metal molds, and an addition-curable liquid silicone rubber (SE6706 from Toray Silicone Co., Ltd.) was poured in from the top. The liquid silicone rubber was cured by hot-pressing at a temperature of 100 degrees C. under a pressure of 25 kg/cm$^2$ for 10 minutes. Test samples were produced in which the silicone rubber was tightly bonded to the synthetic resin boards. The obtained test samples were subjected to the 180 degree peel test described in Japanese Industrial Standard (JIS) K-6744 in order to evaluate the degree of bonding between the cured silicone rubber and the substrate. All of the test samples exhibited cohesive failure, i.e. failure occurred by rupturing of the silicone rubber layer rather than by a separation along the interface between this layer and the substrate.

EXAMPLE 2

A primer composition of this invention was prepared by dissolving 20 parts isopropyl dimethacryl isostearoyl titanate (Plainact 7 from Ajinomoto Co. Inc.) in 80 parts toluene. This primer composition was then coated on 4 different types of synthetic resin boards: nylon 6 resin, nylon 66 resin, polycarbonate resin and ABS resin. The coated boards were then allowed to stand and air-dry for 60 minutes at room temperature. These synthetic resin boards were then placed in metal molds, and an addition-curing liquid silicone rubber (SE6706 from Toray Silicone Co., Ltd.) was poured in from the top. The liquid silicone rubber was cured by hot-pressing at a temperature of 100 degrees C under a pressure of 25 kg/cm$^2$ for 10 minutes. Test boards are produced in which the silicone rubber is tightly bonded to the synthetic resin boards. The adhesion of the cured silicone rubber to the substrate was evaluated using the procedure described in Example 1 with the same results, namely cohesive failure was observed in all of the samples.

EXAMPLE 3

A primer composition prepared as described in Example 1 was applied to a nylon 6 resin board, and the coated board was allowed to stand and air-dry at room temperature for 60 minutes. A 4 mm-thick unvulcanized molding of a silicone rubber compound (SH52U from Toray Silicone Co., Ltd.), to which 0.5% of 2,5- dimethyl-2,5-di(t-butylperoxy)hexane had been added as a crosslinking agent, was then pressed onto this primer-coated surface. The silicone rubber was cured by hot-pressing at a temperature of 170 degrees C under a pressure of 25 kg/cm$^2$ for 10 minutes. A test board was produced in which the silicone rubber was cohesively bonded to the nylon 6 resin board.

EXAMPLE 4

Ten parts isopropyl diacryl isostearoyl titanate (Plainact 11 from Ajinomoto Co., Inc.), 10 parts ethyl orthosilicate and 10 parts vinyltrimethoxysilane were dissolved in 90 parts toluene to prepare a primer composition of this invention. This primer composition was applied to 4 types of synthetic resin boards (nylon 6 resin, nylon 66 resin, polycarbonate resin and ABS resin), and to 4 types of metal plates (iron, stainless steel aluminum and phosphor bronze). The coated plates were allowed to dry under ambient conditions for 60 minutes. These primer-coated synthetic resin boards and metal plates were then placed in metal molds, and an addition-reaction curing liquid silicone rubber (SE6706 from Toray Silicone Co., Ltd.) was then poured in from the top. The resultant composites were hot-pressed under a pressure of 25 kg/cm$^2$ at a temperature of 100 degrees C for 10 minutes in order to cure the liquid silicone rubber. Test samples were obtained in which the silicone rubber was tightly bonded to the both the synthetic resin boards and the metal plates. These test samples were subjected to 180 degree peel test described in Japanese Industrial Standard (JIS) K-6744 in order to determine the degree of adhesion between the cured silicone rubber and the substrate. All of the test samples exhibited cohesive failure, i.e. failure occurred by rupturing of the silicone rubber layer.

EXAMPLE 5

20 Parts isopropyl dimethacryl isostearoyl titanate (Plainact 7 from Ajinomoto Co., Inc.), 10 parts n-propyl orthosilicate, and 10 parts methyl Cellosolve orthosilicate were dissolved in 80 parts toluene to prepare a primer composition of this invention. This primer composition was applied to 4 types of synthetic resin boards (nylon 6 resin, nylon 66 resin, polycarbonate resin and ABS resin), and to 4 types of metal plates (iron stainless steel, aluminum and phosphor bronze). These coated boards and plates were allowed to stand and air-dry under ambient conditions for 60 minutes. The synthetic resin boards and metal plates were then placed in metal molds, and an addition-reacting liquid silicone rubber (SE6706 from Toray Silicone Co., Ltd.) was poured in from the top. The resultant composites were hot-pressed at a temperature of 100 degrees C under a pressure of 25 kg/cm² for 10 minutes to cure the liquid silicone rubber. Test samples were produced in which both the synthetic resin boards and metal plates were cohesively bonded to the cured silicone rubber.

These test samples were subjected to the 180 degree peel test described in Example 1. All of the test samples exhibited cohesive failure.

EXAMPLE 6

The primer composition described in Example 4 was applied to a nylon 6 board and to iron stainless steel and aluminum plates, and the coated substrates were allowed to air-dry under ambient conditions for 60 minutes. A 4 mm-thick unvulcanized molding of a silicone rubber compound (SH52U from Toray Silicone Co., Ltd.), to which 0.5% 2,5-dimethyl-2,5-di(t-butylperoxy)hexane had been added as crosslinking agent, is then pressed onto the primer-coated surfaces, followed by hot pressing of the resultant laminate at a temperature of 100 degrees C. under a pressure of 25 kg/cm² for 10 minutes in order to cure the silicone rubber. Tests samples were produced in which the silicone rubber was cohesively bonded to the nylon 6 resin board and the metal plates.

EXAMPLE 7

Ten parts isopropyl diacryl isostearoyl titanate (Plainact 11 from Ajinomoto Co., Inc.) and 20 parts of a methylhydrogenpolysiloxane were dissolved in 90 parts toluene to prepare a primer composition of this invention. The primer composition was applied to 4 types of synthetic resin boards (nylon 6 resin, nylon 66 resin, polycarbonate resin, and ABS resin), and to 4 types of metal plates (iron, stainless steel, aluminum and phosphor bronze), the coated substrates were allowed to stand and dry under ambient conditions for 60 minutes. The primer-coated substrates were then placed in metal molds, and an addition-reacting liquid silicone rubber (SE6706 from Toray Silicone Co., Ltd.) was poured in from the top. The coated substrates were then hot-pressed for 10 minutes at a temperature of 100 degrees C under a pressure of 25 kg/cm² to cure the liquid silicone rubber. Test samples were obtained in which the cured silicone rubber was cohesively bonded to both the synthetic resin boards and metal plates. All of the test samples boards exhibited cohesive failure when subjected to 180 degree peel test described in Example 1.

EXAMPLE 8

Ten parts isopropyl dimethacryl isostearoyl titanate (Plainact 7 from Ajinomoto Co., Inc.) and 40 parts triethoxysilane were dissolved in 80 parts toluene to prepare a primer composition of this invention. This composition was applied to 4 types of synthetic resin boards (nylon 6 resin, nylon 66 resin polycarbonate resin and ABS resin), and to 4 types of metal plates (iron, stainless steel, aluminum and phosphor bronze). The coated boards and plates were allowed to stand and air-dry under ambient conditions for 60 minutes. These synthetic resin boards and metal plates were then placed in metal molds, and an addition-reacting liquid silicone rubber (SE6706 from Toray Silicone Co., Ltd.) was then poured in from the top. The resulting composites were hot-pressed for 10 minutes at a temperature of 100 degrees C. under a pressure of 25 kg/cm² to cure the liquid silicone rubber. Test samples were produced in which the cured silicone rubber was cohesively bonded to all of the resin boards and metal plates. All of the test samples were subjected to 180 peel test described in Example 1, and all exhibited cohesive failure.

EXAMPLE 9

A primer composition produced as in Example 8 was applied to a nylon 6 board and to iron, stainless steel and aluminum plates. The coated substrates were allowed to air-dry under ambient conditions for 60 minutes. A 4 mm-thick unvulcanized molding of a silicone rubber compound (SH52U from Toray Silicone Co., Ltd.), to which 0.5% 2,5-dimethyl-2,5-di(t-butylperoxy)hexane has been added as crosslinking agent, was then pressed onto the primer-coated surfaces, followed by hot-pressing at a temperature of 120 degrees C under a pressure of 25 kg/cm² for 10 minutes in order to cure the silicone rubber. Tests samples were produced in which the silicone rubber was cohesively bonded to both the nylon 6 resin board and the metal plates.

Primer compositions of the present invention comprising a solution of at least one member from a specified class of organotitanate esters provide cohesive bonding of cured silicone rubber compositions to plastics, particularly synthetic organic resins, when the silicone rubber is cured while in contact with the plastic. The addition of either an organosilicon compound containing at least 2 silicon-bonded alkoxy groups and-/or at least one silicon-bonded hydrogen atom per molecule to the primer composition provides cohesive bonding of silicone rubber to metals in addition to plastics.

That which is claimed is:

1. A primer composition for achieving cohesive bonding between silicone rubber and a plastic or metal substrate, said composition comprising
A. 100 weight parts by weight of an organotitanate ester having the general formula

[HC(R¹)=C(R²)CO(O)]₁ Ti[OC(O)R³]ₘ(OR⁴)ₙ where R¹ and R² individually represent a hydrogen atom or an alkyl radical; R³ and R⁴ represent identical or different alkyl or aryl radicals; l represents an integer having a value of 1, 2 or 3, m and n represent identical or different integers having a value of 0, 1, 2, or 3; and the sum of 1+m+n is equal to 4
B. from 1 to 10,000 parts by weight of either (1) an organosilicon compound having at least 2 silicon-bonded alkoxy groups is each molecule and having the average unit formula R⁵ᵤR⁶ᵥ(OR⁷)ᵥᵥSiO₍₄₋ᵤ₋ᵥ₋ᵥᵥ₎/₂ or (2) an organohydrogensilane or an organohydrogenpolysiloxane containing at least one silicon bonded hydrogen atom per molecule and having the average unit formula HₓR⁵ᵧ(OR⁷)ᵤSiO₍₄₋ₓ₋ᵧ₋ᵤ₎/₂ where R⁵ represents a substituted or unsubstituted monovalent hydrocarbon radical exclusive of the substituents represented by R⁶; R⁶ represents a monovalent organic group containing an addition-reactive or condensation-reactive functional group; $R^7$ represents an alkyl, aryl or alkoxyalkyl radical; the values of u and v are identical or different and are within the range of from 0 to 3, inclusive, the value of w is greater than 0 and no greater than 4, the sum of u and v and w is greater than 0 and no greater than 4, the value of x is from 1 up to but not including 3, the value of y is from 0 up to but not including 3, the value of z is from 0 to 3, inclusive, and the sum of x+y+z is greater than 0 but no greater than 4; and c. a quantity of organic liquid sufficient to solubilize said composition.

2. A primer composition according to claim 1 where $R^1$ represents a hydrogen atom, $R^2$ represents a hydrogen atom or a methyl radical, $R^3$ and $R^4$ represents identical or different alkyl radicals, $R^5$ represents lower alkyl radical, $R^6$ represents an alkenyl radical, $R^7$ represents a lower alkyl radical, the value of l is 2, and the value of m and n are 1.

3. A primer composition according to claim 2 where said organosilicon compound is present at a concentration of from 5 to 2000 parts by weight per 100 parts of said organotitanate ester and is selected form the group consisting of alkyl orthosilicates, methyl Cellosolve orthosilicate and vinyltrialkoxysilanes.

4. A primer composition according to claim 3 where said alkyl orthosilicate is methyl orthosilicate and said vinyltrialkoxysilane is vinyltrimethoxysilane.

5. A primer composition according to claim 2 where said organohydrogenpolysiloxane or organohydrogensilane is present at a concentration of from 5 to 2000 parts by weight per 100 parts by weight of said organotitanate ester and is selected from the group consisting of trialkoxysilanes, alkylhydrogenpolysiloxanes, and dialkylsiloxane/alkylhydrogensiloxane copolymers.

6. A primer composition according to claim 5 where the silicon-bonded alkoxy groups are methoxy or ethoxy and the silicon-bonded alkyl radicals in said alkylhydrogenpolysiloxanes and said copolymers are methyl.

7. A primer composition according to claim 1 where said organic liquid is a liquid hydrocarbon and is present at a concentration of from 100 to 2000 parts by weight per 100 parts of components (A) and (B).

* * * * *